Patented Jan. 9, 1940

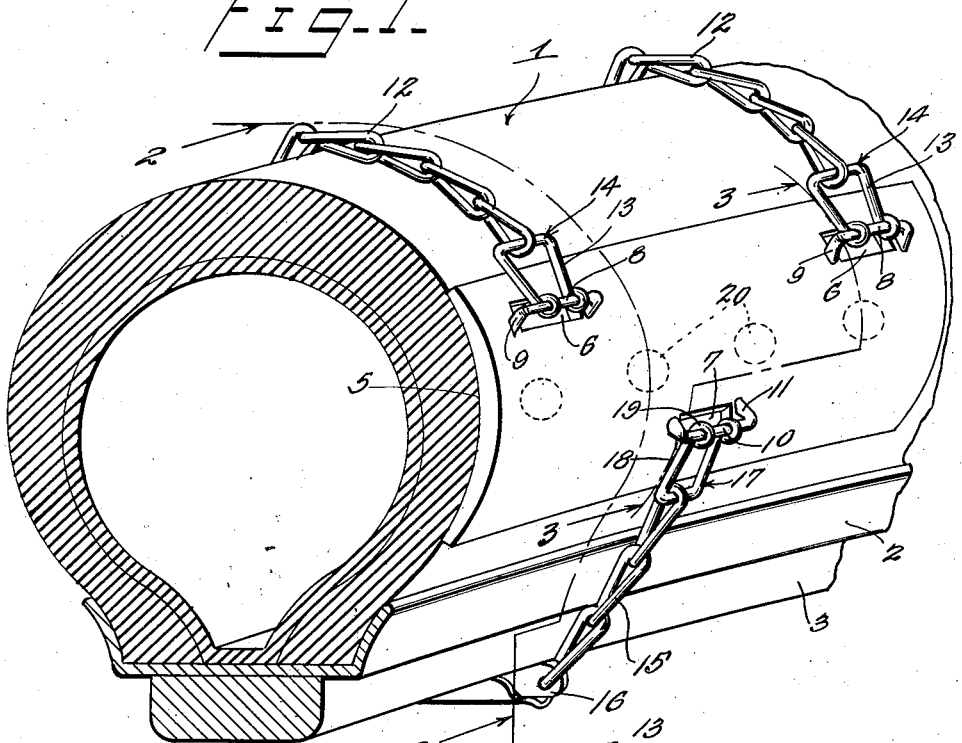
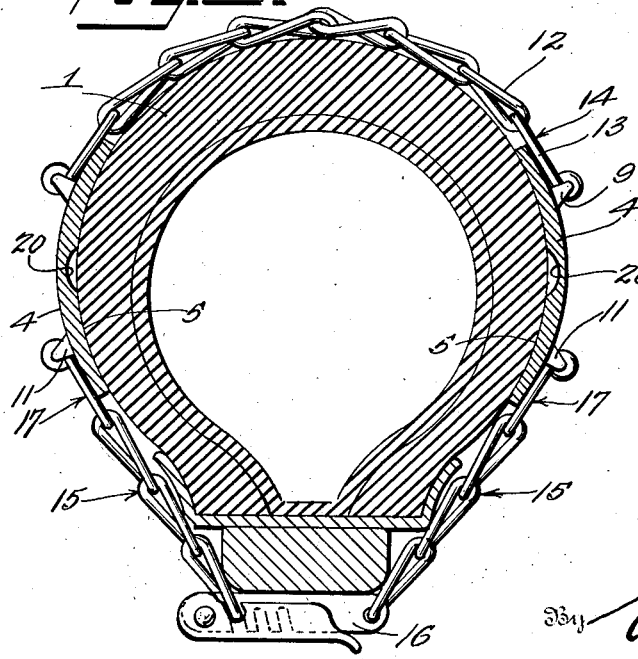
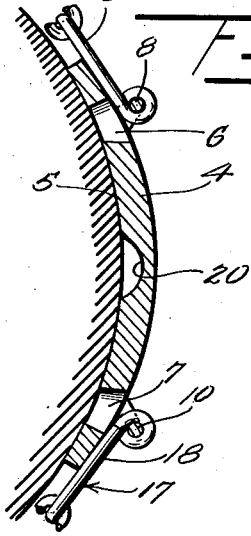

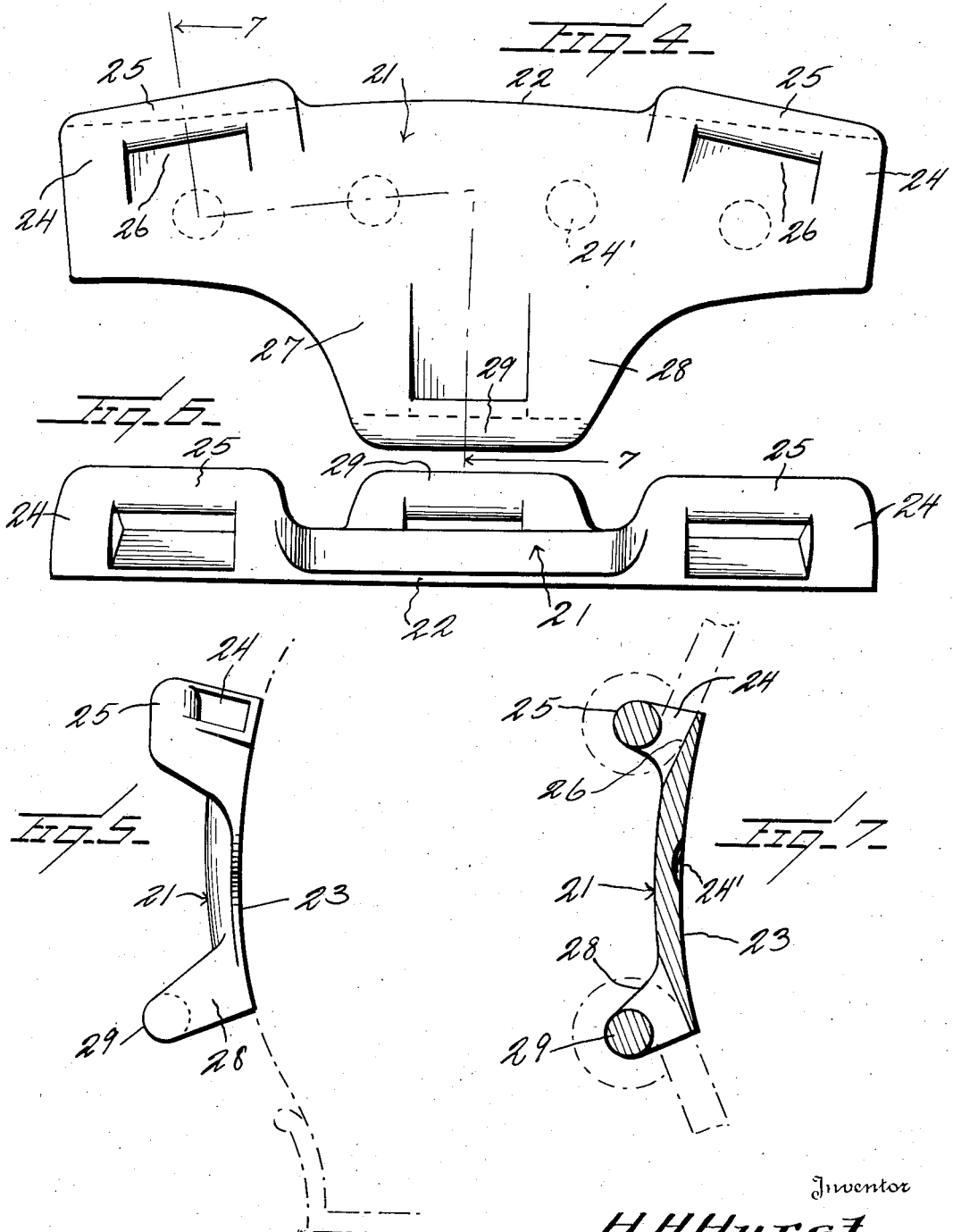

2,186,528

UNITED STATES PATENT OFFICE 2,186,528

ANTISKID UNIT FOR TIRES

Hugh H. Hurst, Sussex, N. J.

Application March 9, 1939, Serial No. 260,822

12 Claims. (Cl. 152—237)

This invention relates to antiskid devices for motor vehicle tires, particularly tires of the pneumatic type, and is designed primarily for use upon truck tires.

The present invention has for its primary object to provide a novel type of antiskid unit for a tire in which novel means is employed for maintaining the unit in position so that it will not shift or creep around the casing.

Another object of the invention is to provide an anti-skid unit for a tire of the pneumatic type in which metal side plates are employed which are connected by tread crossing chains and a felly crossing chain and which are constructed in a novel manner which results in their maintaining a close adherence to the wall of the tire casing which prevents movement of the antiskid unit around the casing.

Still another object of the invention is to provide in a tire chain unit of the above described character, a novel means for drawing the tire casing engaging plates into tight contact with the casing along the upper and lower longitudinal edges of the plates.

A further and more general object of the invention is to provide an antiskid unit for a pneumatic tire in which tread cross chains are held in place against movement around the body of the tire casing by a novel construction which sets up a tight or close engagement between parts of the unit and the tire casing by suction when the casing becomes wet.

The invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claims.

In the drawings:

Fig. 1 is a view in perspective of a portion of a tire casing and supporting rim and wheel felly showing one of the units embodying the present invention in position thereon.

Fig. 2 is a view in section taken on the line 2—2 of Fig. 1 through the casing and a portion of the antiskid unit.

Fig. 3 is a sectional view taken on the line 3—3 of Fig. 1.

Fig. 4 illustrates a modified form of tire casing wall engaging plate, the same being shown in front elevation.

Fig. 5 is an end edge view of such plate.

Fig. 6 is a front edge view of the plate.

Fig. 7 is a view in transverse section of the modified plate on the line 7—7 of Fig. 4.

Referring now more particularly to the drawings, a description will first be given of the form of the invention illustrated in Figs. 1 to 3. In these figures, the numeral 1 generally designates a portion of a motor vehicle pneumatic tire with which is shown a portion of the supporting rim 2 and of a wheel felly 3 upon which the rim is mounted in the usual manner. These parts of the tire, rim and felly are conventionally illustrated for the purpose of showing the application of the antiskid unit and in themselves form no part of the present invention.

The structure embodying the present invention as comprised in the form illustrated in the figures above referred to, consists of two elongated rectangular plates of metal, each of which is indicated by the numeral 4. These plates are designed to position against the inner and outer sides of the tire casing 1 and in order that they may conform to the curvature of the casing, each has its inner face of transversely arcuate contour as indicated at 5. In addition to having the inner faces of arcuate contour as stated, each of the plates is preferably arcuate transversely of its outer face but is of slightly greater thickness at its longitudinal center than at its longitudinal edges, as shown in Figs. 2 and 3. These plates are of sufficient width to cover substantially the major part of the side wall of the tire against which it is positioned, so that the plate has a relatively large contact area with the tire.

Each plate has an opening 6 formed therethrough adjacent to and inwardly of one longitudinal edge which, when the plate is in operative position, is disposed nearest the tread of the tire and adjacent the opposite longitudinal edge but set back therefrom is a similar opening 7. It is preferred that there be two of the openings 6 and a single one of the openings 7, the latter opening being arranged on the transverse center of the plate, as illustrated in Fig. 1.

Each of the openings 6 has a keeper bar 8 extending longitudinally thereof and longitudinally of the plate and joined to the plate by the short outstanding posts 9 and the opening 7 has a similar keeper bar extending lengthwise thereof, as indicated at 10, which is joined to the plate by the short heavy posts 11.

The numeral 12 indicates cross chains for the tread of the tire. These chains may be of any suitable character or instead of being in the form of chains, they may be in the form of composite rubber material suitable for use as an antiskid unit, which is in the form of a strand extending across the tread of the tire in the same manner as the chains illustrated. When chains are used in making up the antiskid device, it is preferred that they be of the twisted link type shown and each of the keeper bars 8 has coupled therewith the side portions or legs 13 of a U-link 14, the ends of the legs being turned about the bars 8 in the manner illustrated.

The numeral 15 generally designates a separable holding chain for maintaining the device in position, this chain being divided intermediate its ends and having the two portions thereof connected together by a separable coupling 16. At each end of the holding chain 15, a U-shaped link 17 is attached, which has the ends of its legs 18 provided with eyes 19 which engage about the keeper bars 10 of the plates 4 at each end of the keeper chain.

By providing the plates 4 with the apertures 6 and 7 beneath the keeper bars 8 and 10, respectively, it will be apparent that the keeper bars may be placed in closer proximity to the plates without interfering with the attachment of the U-links thereto, for by this construction, the eyes at the ends of the legs of the U-links may be partially formed and then slipped under the keeper bars by first being extended down into the openings beneath the keeper bars.

It will be noted that the posts of the keeper bars are inclined slightly toward the adjacent edges of the plates and that the bars are so arranged that the U-links connected therewith will bear down against the outer surfaces of the plates where they cross the plate edges, as shown in Figs. 2 and 3, when the device is in position upon a tire and the latter is inflated, or when the tire is supporting a load which causes the side walls to spread slightly more than under normal conditions. In the modified form of the invention illustrated in Figs. 4 to 7, the keeper bars or chain loops are likewise mounted in such a manner that this action is obtained, except that in the form of the invention just described, the keeper bars are set back from the longitudinal edges of the plate while in the referred to modified form, they are set directly on the edge of the plate. With these arrangements of the keeper bars, the longitudinal edges of the plates are drawn into tight contact with the wall of the tire casing when the plates are secured to the tire by the cross chains in the manner illustrated in Fig. 1. This has a two-fold function, first, that it tends to exclude air from between the plate and the casing wall and, second, that it tends to cause the long edges of the plates to press against the wall of the casing, thus opposing any movement of the plates on the casing either toward the tread or toward the rim 2.

In order that the movement of the unit on the tire casing may be positively prohibited, the inner surface of each plate 4 is provided with one or more recesses or cups as indicated at 20, which open toward the wall of the casing. These cups operate when the tire becomes wet and the water works in between the plate and the casing, to set up a sucking action as a result of the constant relative movement of the tire in expanding and contracting when the wheel rotates and thus by this sucking action, the movement of the device on the tire is positively prevented.

In Figs. 4 to 7, there is shown a modified form of the plate unit which is used with a corresponding plate to form a pair which are connected together on a tire casing by chains in the same manner as the plates 4 are shown. In this modification of the plate unit, the plate body which is indicated as a whole by the numeral 21, is of longitudinally arcuate form having an arcuate front edge 22 which substantially conforms to the curvature of the tire casing against the side wall of which it is placed. The inner face of the plate 21 is also transversely concave, as indicated at 23, to fit the curvature of the casing, and may be provided with the suction cups or depressions 24 corresponding with the cups 20 and performing the same function when the plate is in use.

At each end of the plate 21, there is placed upon the edge 22, the upwardly and outwardly inclined keeper bar supporting posts 24 between the outer ends of which a bar 25 is connected, thus forming a chain attaching loop for the connection of a cross chain between two plates. As will be seen upon reference to Fig. 4, these loops lean forwardly over the adjacent arcuate edge 22 of the plate and the pair of loops have their adjacent ends set out beyond the edge 22 a slightly greater distance than the remote ends. Thus these loops not only lean or incline forwardly over the edge 22 but are directed away from the plate on slightly divergently related lines, the purpose for which arrangement will be hereinafter described.

Beneath the bar 25 of each of the chain loops the plate body is cut away slightly, as indicated at 26, so that the adjacent edge of the plate is thinned down. The distance which the bars 25 are set out away from the plate is just great enough to permit the eyes of a connecting chain link to engage about the bar and thus when such chain is drawn into working position like the chains 12 of Fig. 1, the link which is directly connected with a bar 25 will bear down against the underlying edge of the plate body, as is indicated in dotted outline in Fig. 7.

At the opposite or back edge of the plate 21, the plate has a central edge extension 27 and secured upon the top thereof are the outwardly leaning posts 28 of a chain loop, the cross bar of which is indicated by the numeral 29. The cross bar 29 of the central chain loop is adapted to position adjacent the wheel rim and to have connected thereto an end of the chain which passes over the wheel felly to secure the plate to a corresponding plate upon the opposite side of the tire. This bar 29 extends straight with respect to the length of the adjacent plate instead of obliquely of the plate length as do the bars 25, and in being arranged by the outwardly leaning posts 28, over the corresponding edge of the portion 27, it will be seen that the loops upon one side are leaned or inclined away from those upon the other side. This arrangement of the loops is provided to facilitate the use of the plate upon the inner side of one of the two tires of a dual wheel. It will be seen from this arrangement, as well as with the arrangement of the keeper loops upon the plate 4 shown in Fig. 1, that the plates may be conveniently placed between the tires on dual wheels and there will be no danger of the side wall of the opposite wheel striking or rubbing against the keeper loops when the walls of the tire bulge under load.

By directing the keeper loops in forwardly divergent relation from the edge 22 of the plate, the chains connecting these loops with corresponding loops of an opposite plate will be held in a manner which will make them tend to separate on the tire, or in other words, will cause them to tend to move in opposite directions and by this means, a more secure connection of the cross chains with the tire tread is effected and corresponding better traction effect is obtained.

Because of the novel construction of the plates, they will be prevented from rocking on the sides of the tire or move thereon as stated, and the prevention of such movement is also insured by reason of the manner of placing the keeper bars to which the chain connecting U-links are attached. By attaching the chains to the outer surface of the plate, they are prevented from coming in contact with and wearing the side walls of the tire and, in addition, by employing the novel attaching means described, the chains are prevented from turning.

By forming the keeper bars of circular cross-section, the turned or eyed ends of the U-links are permitted to rock slightly thereon, thus preventing binding of the parts and also this permits the necessary relative movement between the chains and the plates and prevents excessive strain on the chains when the portion of the tire which contacts the road bulge or swell under load.

While only a single antiskid device has been illustrated, it will, of course, be understood that a number of these devices will be applied to each vehicle tire for use, three of the devices being preferred for use upon each tire.

What is claimed is:

1. A pneumatic tire antiskid device unit, comprising a plate body adapted to position against a side wall of a tire casing and to extend in a circumferential direction thereon, means for securing antiskid chain units to said body, comprising a pair of loop members disposed at one longitudinal edge of the body and extending lengthwise thereof, each of said loops being inclined away from the longitudinal center of the plate, each loop being set sufficiently close to the outer face of the plate to insure the tight contact with the adjacent plate edge of a link of a chain attached to the loop when said chain is drawn from the loop across the tread of the tire, and means at the opposite edge of the plate for attaching thereto a securing chain extending through the tire.

2. A pneumatic tire antiskid device unit, comprising a plate body adapted to position against a side wall of a tire casing and to extend in a circumferential direction thereon, means for securing antiskid chain units to said body for extension therefrom across the tread of an adjacent tire, comprising a pair of loop members disposed adjacent to an edge of the body and extending lengthwise thereof, each of said loops extending from the adjacent face of the plate body in a plane inclined away from the longitudinal center of the body, each of said loops including a straight bar portion designed to have an end link of a chain oscillatably coupled therewith and said bar portions being in sufficiently close proximity to the said face of the plate body to effect the contact of the said attached link with the adjacent edge of the plate body whereby when said antiskid chain units are connected across a tire tread between said loops, a compressing action against the said edge of the plate body will be obtained to force the same tightly against the tire casing, and means adjacent the opposite edge of the plate body for the attachment thereto of a securing chain extending through the tire, said last means comprising a loop secured to the outer side of the plate and inclined oppositely to the first-mentioned loops.

3. A pneumatic tire antiskid device unit, comprising a plate body adapted to position against a side wall of a tire casing and to extend in a circumferential direction thereon, means for securing antiskid chain units to the body, comprising a pair of loop members disposed at one longitudinal edge of the body and extending lengthwise thereof, each of said loops being inclined away from the longitudinal center of the body and overlying the adjacent edge of the body, the said loops further extending substantially obliquely to the length of the plate body in outwardly divergent relation from the adjacent plate edge, and a loop member secured to the plate body adjacent the opposite edge and inclined toward the adjacent plate edge away from the first-mentioned loops and extending lengthwise of the plate.

4. A pneumatic tire antiskid device unit, comprising a plate body adapted to position against a side wall of a tire casing and to extend in a circumferential direction thereon, said plate having a longitudinally arcuate edge substantially corresponding to the curvature of the tire against which it is placed, means for securing antiskid chain units to said body, comprising a pair of loop members disposed adjacent the said arcuate edge and extending lengthwise of the plate, each of said loops having the openings thereof directed outwardly from the adjacent plate edge in divergent relation, and a loop member secured to the plate adjacent the opposite longitudinal edge and disposed in a plane extending transversely of the plate between the first-mentioned loops.

5. A pneumatic tire antiskid device unit, comprising a plate body adapted to position against a side wall of a tire casing and to extend in a circumferential direction thereon, said plate having a longitudinally arcuate edge substantially corresponding to the curvature of the tire against which it is placed, means for securing antiskid chain units to said body, comprising a pair of loop members disposed adjacent the said arcuate edge and extending lengthwise of the plate, each of said loops having the openings thereof directed outwardly from the adjacent plate edge in divergent relation, and a loop member secured to the plate adjacent the opposite longitudinal edge and disposed in a plane extending transversely of the plate between the first-mentioned loops, the said first-mentioned loops being inclined away from the longitudinal center of the plate and the last-mentioned loop being inclined in the opposite direction away from the longitudinal center of the plate.

6. A pneumatic tire antiskid device, comprising a pair of plate-like bodies adapted to position against the sides of and extend in a circumferential direction about a tire casing, flexible antiskid units for connecting said bodies across the tread of the tire, means connecting said bodies and adapted to extend across the inside of the tire, and means for setting up a suction effect between said bodies and the opposing face of the tire which operates to prevent shifting of the device on the tire.

7. A pneumatic tire antiskid device, comprising a pair of elongated transversely bowed plates adapted to conform to the side wall curvature of a tire, flexible connecting strands between two adjacent side edges of the plates and adapted to extend across the tread of a tire, means for detachably coupling the other side edges of the plates across the felly of a tire carrying wheel, and means on the inner faces of the plates for producing a suction action between such faces and contacting surfaces of a tire wall.

8. A pneumatic tire antiskid device, comprising a pair of elongated transversely bowed plates adapted to conform to the side wall curvature of a tire, flexible connecting strands between two adjacent side edges of the plates and adapted to extend across the tread of a tire, means for detachably coupling the other side edges of the plates across the felly of a tire carrying wheel, and means on the inner faces of the plates for producing a suction action between such faces and contacting surfaces of a tire wall, said flexible strands and said coupling means being joined to the plates inwardly of the side edges thereof and adapted to engage the adjacent edges and press the same inwardly against the tire wall.

9. A pneumatic tire antiskid device, comprising two elongated plates designed to position upon opposite sides of a tire casing and having opposed transversely bowed casing engaging inner faces, means set inwardly from one longitudinal edge of each plate for attaching a chain thereto, tire tread crossing chains coupling the said means of one plate with those of the other plate, said chains when in plate connecting position on a casing bearing against and pressing the adjacent edges of the plates tightly against the casing, means adapted to extend across the felly of a tire carrying wheel for detachably coupling the other edges of the plates and adapted to press said other edges tightly against the casing, and means for setting up a suction action between the plates and casing consisting of pockets formed in casing engaging faces of the plates.

10. A pneumatic tire antiskid device, comprising a pair of plate bodies adapted to position against opposite sides of a tire casing and extend in a circumferential direction thereon, flexible antiskid units connecting adjacent edges of the bodies and adapted to extend across the tread of the tire casing, means for coupling said bodies together across the inner side of the tire casing, and means for effecting the compression of the long edges of the plate bodies against the tire casing which comprises connecting the ends of the said antiskid units with the bodies at points sufficiently far inwardly from the edges of the bodies over which the units pass to cause said units to bear against the edges of the plate bodies when the device is in operative position upon a tire casing.

11. A pneumatic tire antiskid device, comprising a pair of plate bodies adapted to position against opposite sides of a tire casing and extend in a circumferential direction thereon, flexible antiskid units connecting adjacent edges of the bodies and adapted to extend across the tread of the tire casing, means for coupling said bodies together across the inner side of the tire casing, and means for effecting the compression of the long edges of the plate bodies against the tire casing which comprises connecting the ends of the said antiskid units with the bodies in a manner to cause said units to bear against the edges of the plate bodies when the device is in operative position upon a tire casing.

12. A pneumatic tire antiskid device, comprising a pair of plate bodies adapted to position against the sides of a tire casing to extend longitudinally thereon, a pair of bars secured to each body upon and spaced from the side thereof opposite from the casing against which the body positions, the said bars being separated longitudinally of the bodies and set inwardly of the edges of the bodies nearest the tread of the casing, a pair of flexible antiskid units adapted to position across said tread, a link connecting each end of each flexible unit with one of said bars, means connecting the other edges of the bodies together across the inner side of the tire casing and said bars being so disposed relative to the adjacent edges of the bodies that the links connected therewith will bear against and extend across the said adjacent edges to press the bodies firmly against the tire casing when the device is in position thereon.

HUGH H. HURST.